United States Patent Office | 3,268,404 | Patented August 23, 1966

1

3,268,404
COMPOSITIONS FOR TREATING AVIAN RESPIRATORY DISEASES AND METHODS OF USING SAME

John A. Banford, Lake Bluff, Ill., and Gerald L. Reuter, Ashland, Ohio, assignors to Richardson-Merrell Inc., New York, N.Y., a corporation of Delaware No Drawing. Filed Oct. 4, 1965, Ser. No. 492,858
11 Claims. (Cl. 167—53.1)

This is a continuation-in-part of our copending application Serial No. 224,831, filed September 19, 1962.

This invention relates to new compositions of matter and their use in treating avian respiratory diseases.

Chronic respiratory disease is a respiratory infection of chickens and turkeys characterized by respiratory rales, coughing, and nasal discharge. The clinical manifestations are slow to develop, and the disease has a long course. Chronic respiratory disease has become an important flock problem in all areas of the United States. An avian pleuropneumonia like organism is considered the causative agent of chronic respiratory disease and infectious sinusitis of turkeys.

Characteristic signs of the disease in adult flocks are rales, nasal discharge, and coughing. Feed consumption is reduced, and large weight losses are noted. In adult flocks, mortality is notable, however, considerable loss from reduced egg production and culls is taken. Mortality in broilers varies from a very low in the uncomplicated disease as high as 30% in complicated outbreaks. Retarded growth and downgrading of carcasses also add to the losses. Recovery from the clinical signs of this disease generally yields some degree of immunity.

Various therapeutic agents have been used to treat these conditions with varying degrees of success. Ordinarily, it is not feasible to attempt to isolate the sick birds and treat them separately. It has been found effective and most economical to treat the entire infected flock by dusting the birds with a finely powdered material in which the drug is suspended on a carrier. As the dust slowly settles, quantities of the drug suspended therein are inhaled by the birds and they are thus medicated as a group. Unfortunately, however, most of the medicated dusts previously used tend to settle out rather rapidly and as a result some of the individual birds may either inhale too much of the medicated material, or not enough. In other words, most of the dusts that have been described and used heretofore have the disadvantage of rapid settling with a resulting non-uniformity of treatment. The present invention is based upon our discovery of a new suspending agent for carrying selected therapeutic agents to be administered to poultry in the form of a dust to be taken into their respiratory tract.

Among the more successful poultry dusting preparations previously used is a micronized mixture of 25% by weight of urazolidone and 75% by weight of magnesium trisilicate. The mean particle size of the carrier is about 2 microns. The mean particle size of the furazolidone is about 2 to 4 microns. One hundred grams of this micronized mixture which has a volume of 300 ccs. will effectively treat 1,000 birds when dusted into the air about two feet above the roosting birds, preferably when they have settled down for the night.

2

The new composition of the present invention was compared in field trials with the above. A crystalline grade of furazolidone was micropulverized to a mean particle size of 2 to 4 microns and 68.2 parts by weight of this material was thoroughly mixed under conditions of high shear in a Waring Blendor with 31.8 parts by weight of microfine colloidal silicon dioxide. One hundred grams of this mixture increases in volume during the mixing operation until it has a volume of about 1000 ccs. The silicon dioxide carrier used in this preparation was a material sold under the name Quso F–20 by Philadelphia Quartz Company, Philadelphia, Pennsylvania. The ultimate particles of these products have diameters in the range of 9 to 14 millimicrons which are aggregated into chain-like structures which have a mean diameter of about 2.5 microns.

Each of the above described powders were dispersed with an air-operated powder deagglomerator into a 50 cubic foot semi-symmetrical chamber. Equal volumes of the powders were suspended in the chamber and samples from the suspension were collected with a cascade impactor and the concentration of furazolidone was determined by infra-red analysis. Calibration and control work were sufficient to indicate that the carrier did not affect these measurements. As a result of these studies, it was found that the furazolidone concentration in the atmosphere dusted with the product in which micronized magnesium trisilicate was the carrier fell from a level of 0.1 mg. per cubic foot at five minutes after dusting to about 0.023 mg. per cubic foot at twenty-five minutes after spraying. On the other hand, the furazolidone level in the atmosphere dusted with the above described product of the present invention was about 3.0 mg. per cubic foot at five minutes after spraying and remained as high as 1.6 mg. per cubic foot after twenty-five minutes. It was also found that practically all of the furazolidone had settled out within 70 minutes with the magnesium trisilicate powder whereas at the end of this time effective amounts, at least 0.5 mg. per cubic foot, of the furazolidone remained in the atmosphere when the dust contained the silicon particles.

These findings are particularly surprising in view of the fact that the suspensions of the dust were formed from equal volumes of the powder and the furazolidone concentration was much smaller in the dust made with the microfine silicon particles.

The greater effectiveness of the new furazolidone dust was also determined in field trials. Broiler flocks with symptoms of respiratory disease characterized by rattles, coughs, and sneezes and revealing aerosacculitis upon necropsy were treated. In one test the flock had an early chick mortality. The birds had a laboratory diagnosis for CRD complex at 6½ weeks of age with some daily mortality. One broiler house having 5,800 birds was dusted with the commercial product described above, in which the furazolidone was micronized with magnesium trisilicate, at the rate of 250 g. of product per 2,500 birds. A second broiler flock of 4,700 birds was dusted with the product of the present invention at the rate of 22 g. of the medicated dust per 2,500 birds. The birds were the same hatch, same breed, and on the same feed. The dust was applied with a duster of the type used in applying powdered insecticides and fungicides to plant foliage.

The medication was suspended at approximately two feet over the roosting flocks on two occasions 24 hours apart.

After treatment sneezing subsided and death losses were reduced in both houses, but more so in the house dusted with the dust of the present invention. At market time, there was no noise and practically no losses. The birds treated with the dust of the present invention had a higher average weight, 3.38 lbs. as against 3.19 lbs. for those dusted with the commercial dust, and had used their feed with a higher efficiency, the ratio being 2.36 to 2.44. There were also fewer condemnations in the flock which had been treated with the dust of the present invention.

Numerous other field trials such as the foregoing have been conducted and results similar to those described above have been recorded.

The reasons for the superior suspending quality of the dust prepared with he microfine silicon dioxide particles is not understood. As noted above, they have extremely small ultimate particle sizes which are agglomerated. Although the loose structure of these agglomerates may account for their superior suspending properties, it is also possible that electrostatic forces may be involved. Micronized furazolidone is highly electrostatic, for instance, and it is possible that the surface of these micronized particles is covered by a thin layer of the extremely small micro fine colloidal silicon dioxide thus insulating the larger furazolidone particles from each other.

Microfine silicon dioxide powders suitable for use in practicing the present invention can be obtained by various processes. One process involves preparation in a hot gaseous environment (1100° C.) by the vapor phase hydrolysis of a silicon dioxide compound. One of these products is known as fumed silicon dioxide, and is commercially available under the trade name Cab-O-Sil. Another suitable colloidal silicon dioxide for practicing the invention is the one used in the trials just described. The ultimate particle size of these colloidal silicon dioxide products varies from about 0.005 to 0.020 micron. The micron fine silicon dioxide used in the examples above had an ultimate particle size of 0.009 to 0.014 micron. These are agglomerated in chains or clumps of mean particle sizes of about 1 to 10 microns. The bulk density may vary from 2.5 up to about 10 pounds per cubic foot. These products are non-toxic and have been approved for use in various pharmaceutical preparations. Inhalation of the dust is not harmful to the birds.

The microfine silicon dioxide powders used in practicing the present invention are distinctly different from previously described silicon dioxide powders which have been used as anti-caking or bulking agents for therapeutic dusts. The earlier silicon dioxide powders are characterized by having relatively large particle sizes, about 0.5 to 5 microns. The ultimate size of the particles of the silicon dioxide of the present invention ranges between about 0.005 to 0.020 micron.

The ultimate particles of the amorphous silica gel products of the prior art have been described as being essentially hollow spheres with comparatively low external surface area and high internal surface area. The ultimate particles of the amorphous silica gel products used in practicing the present invention are essentially spherical but have a highly irregular external surface with high external surface area and low internal surface area. It has been estimated that of the total surface area, internal and external, the hydrogels of the prior art have an external surface area of 10% of the total surface area whereas in the microfine silicon dioxide particles of the present invention the external surface area is about 80–90% of the total surface area.

The silica gel particles of the prior art may occur as agglomerates which can be broken down only with high energy. The agglomerates of the silicon dioxide particles used in the present invention are easily broken down.

The foregoing comparison of the silicon dioxides of the prior art and those used in practicing the present invention does not apply, however, to the finely ground crystalline silicon dioxides which are also used as anti-caking and bulking agents. These finely divided crystalline silicas cannot be used in therapeutic dusts because of danger of injury to the respiratory tract of the animal or the worker who may apply the dust. The microfine particles of the present invention are so small that they can pass through the intercellular spaces of the lung tissue and be absorbed in the blood stream and subsequently excreted in the urine. The amorphous silica particles of the prior art are not absorbed but are flushed from the lungs by ciliary action. The crystalline silicon dioxides tend to remain in the lungs and cause injury to the tissues.

As will be noted from the foregoing field trials, the new dust of the present invention was more effective when applied at the rate of 22 g. per 2,500 birds than was the commercially available dust at 250 g. per 2,500 birds. At these rates of application, the birds were treated with approximately 15 g. of furazolidone when using the new dust and 62.5 g. of furazolidone when using the commercial dust. In addition, the volume of the 22 g. of new dust was approximately 220 cc. as compared with 700 cc. for the commercial dust. It will be apparent from these figures that the new dust of the present invention is not only more effective, but it contains less of the drug and smaller volumes of the powder can be used. It is, therefore, less expensive to make, package, transport, store and apply.

Although the invention was illustrated with particular reference to furazolidone as the micronized drug various other drugs have been micronized and administered to poultry by inhalation and these can be formulated into more efficient dusts with microfine silicon dioxide as described herein. Among these may be mentioned dihydrostreptomycin, streptomycin, oxytetracycline, chlorotetracycline, tetracycline, chloromycetin, polymyxin and neomycin. The nitrofurans are particularly useful in the treatment of respiratory diseases in poultry and many of these therapeutically valuable agents have been described and can also be used in preparing the new dusts of the present invention.

Among these may be mentioned, in addition to 5-nitro-2-furaldehyde semicarbazone (nitrofurazone), N-(5-nitro-2-furfurylidene)-3-amino-2-oxazolidone, N - (5 - nitro-2-furfurylidene)-3-amino-5-(N' - morpholinylmethyl) - 2-oxazolidone, 5-nitro-2-furaldehyde acetylhydrazone, 5-nitro - 2 - furaldehyde-2-(2-hydroxyethyl)semicarbazone, N - (5 - nitro - 2 - furfurylidene) - 1 - amino - 2 - pyrrolidone, N - (5 - nitro - 2 - furfurylidene) - 1 - amino - 2-imidazolidone, N - (5 - nitro - 2 - furfurylidene) - 1-amino - 2 - imidazolidinethione, and N - (5 - nitro - 2-furfurylidene)-1-aminohydantoin. These and other effective nitrofurans are characterized by having the nucleus:

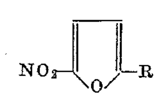

The group R may represent substituent radicals such as alkyl, hydroxyalkyl, acyloxyalkyl, oximidoalkyl, semicarbazonalkyl, hydrazonoalkyl, diacyloxyalkyl, carboxyalkenyl, carbalkoxyalkenyl, acyl, carbalkoxy, halogenocarbalkoxy, carbamyl, dialkylcarbamyl, and still others. Many of these are described in United States Patents Nos. 2,436,214, 2,610,181, 2,742,462, 2,802,002 and others.

The amount of dust to be suspended in the air which the poultry breathe and the frequency of the application will depend considerably on the effectiveness of the drug. As illustrated herein, 22 g. of the dust containing 15 g. of furazolidone was sufficient to treat 2,500 birds. This treatment was found effective with one dusting but several dustings at 24 hour intervals was found to be more effective in flocks more severely infected with respiratory disease. Where the flock is in a larger space and the birds more widely scattered, more of the dust should be used to be sure of adequate treatment. Since the nitrofurans, especially, are relatively nontoxic when administered according to the present invention, there appears to be no upper limit as to either the concentrations of the dust or the frequency of application.

An improved therapeutic dusting powder having the unique advantages of the product of the present invention cannot be prepared by simple mixing the commercially available grades of microfine silicon dioxide with micropulverized drug which has a particle size within the range of 1 to 20 microns. To obtain a product of maximum effectiveness it is necessary that the agglomerates which occur in the commercially available products be broken down. The agglomerates may be broken down to a sufficient extent in the laboratory in a Waring Blendor or similar device which develops a high shear on the agglomerated particles. In larger scale production, a twin shell blendor with high speed intensifier blades may be used. Hammer mills, ball mills and other types of disintegrating, pulverizing and grinding machines which develop a high disrupting force of the agglomerates may also be used to break up the commercial product to release the ultimate 5 to 20 millimicron particles for coating the drug.

In preparing the new dusting powders of the invention it is preferred that the agglomerates be broken up in the presence of the drug that is used in the preparation. During the process of breaking up the agglomerates, the bulk of the mixture increases considerably. For example, a mixture of 32% by weight of the microfine silicon dioxide and 68% of micronized furazolidone which had a bulk density of 28½ lbs. per cubic foot had a bulk density of about 5.75 pounds per cubic foot after the disintegration procedure. This increase in volume may serve as a guide to the operator to determine when the microfine silica gel agglomerates have disintegrated to a sufficient extent to obtain optimum results with the final product. The increase in volume of the mixture during the deagglomeration process should be at least 100% in order to obtain a superior product. However, as indicated above, the increase in volume may be as much as 5 or 6 times during the disintegration process.

The silicon dioxide agglomerates may be disintegrated apart from the drug which is finally incorporated in the dust. The drug may also be micronized by itself. However, in such a case there should be a thorough final mixing of the deagglomerated silicon dioxide particles and drug components so that the drug particles are coated with the ultra fine silcon dioxide particles.

The proportion of drug to silicon dioxide may vary considerably. As shown in the particular example illustrated the drug consisted of more than 68% of the total weight of the product. Even more of the drug, up to about 80%, by weight, may be incorporated in the dust. On the other hand, there appears to be no lower limit on the amount of drug in the dust. In view of the fact that large volumes of the microfine silicon dioxide are unnecessary and tend to increase the cost of the material and the bulk of the powder that must be applied, it is preferred that the product have no more than 20 to 60% by weight of the microfine silicon dioxide.

What is claimed is:

1. A method of treating infections involving the respiratory tract of poultry which comprises suspending in the air above the poultry to be treated a dust comprising an effective amount of a finely-divided therapeutic agent, the particles of which are coated with a microfine silicon dioxide, the ultimate particles of which have a diameter of 5 to 20 millimicrons.

2. A method of treating infections involving the respiratory tract of poultry which comprises suspending in the air above the poultry to be treated a dust comprising an effective amount of a finely-divided nitrofuran therapeutic agent, the particles of which are coated with a microfine silicon dioxide, the ultimate particles of which have a diameter of 5 to 20 millimicrons.

3. A method of treating infections involving the respiratory tract of poultry which comprises suspending in the air above the poultry to be treated a dust comprising an effective amount of a finely-divided furazolidone therapeutic agent, the particles of which are coated with a microfine silicon dioxide, the ultimate particles of which have a diameter of 5 to 20 millimicrons.

4. A composition of matter for the treatment of poultry which comprises a therapeutic agent having a particle size within the range 1 to 20 micron coated with a microfine silicon dioxide, the ultimate particles of silicon dioxide having a diameter of 5 to 20 millimicrons.

5. A composition of matter for the treatment of poultry which comprises an effective amount of a nitrofuran therapeutic agent having a particle size within the range 1 to 20 microns coated with a microfine silicon dioxide, the ultimate particles of silicon dioxide having a diameter of 5 to 20 millimicrons.

6. A composition of matter for the treatment of poultry which comprises 40 to 80% by weight of nitrofurazone having a particle size within the range 1 to 20 microns coated with a microfine silicon dioxide made up of discrete particles of silicon dioxide having a diameter of 5 to 20 millimicrons.

7. A composition of matter for the treatment of poultry which comprises 40 to 80% by weight of furazolidone having a particle size within the range 1 to 20 microns coated with a microfine silicon dioxide made up of discrete particles of silicon dioxide having a diameter of 5 to 20 millimicrons.

8. A method of preparing a therapeutic dust for the treatment of infections of the respiratory tract of poultry which comprises subjecting a microfine silicon dioxide which is in the form of agglomerates of 1 to 20 microns, the said agglomerates being made up of discrete particles of silicon dioxide having a diameter of 5 to 20 millimicrons to a deagglomeration process in the presence of a therapeutic agent having a particle size within the range of 1 to 20 microns whereby the agglomerates are subjected to a shearing action and are partially broken up to an extent that the volume of the material being subjected to deagglomeration is increased in volume by at least 100% and the smaller particles of silicon dioxide coat the therapeutic agent in contact therewith.

9. A method of preparing a therapeutic dust for the treatment of infections of the respiratory tract of poultry which comprises subjecting a microfine silicon dioxide which is in the form of agglomerates of 1 to 20 microns, the said agglomerates being made up of discrete particles of silicon dioxide having a diameter of 5 to 20 millimicrons to a deagglomeration process in the presence of furazolidone having a particle size within the range of 1 to 20 microns whereby the agglomerates are subjected to a shearing action and are partially broken up to an extent that the volume of the material being subjected to deagglomeration is increased in volume by at least 100% and the smaller particles of silicon dioxide coat the furazolidone in contact therewith.

10. A method of preparing a therapeutic dust for the treatment of infections of the respiratory tract of poultry which comprises subjecting a microfine silicon dioxide which is in the form of agglomerates of 1 to 20 microns, the said agglomerates being made of discrete particles of silicon dioxide having a diameter of 5 to 20 millimicrons to a deagglomeration process in the presence of nitrofurazone having a particle size within the range of 1 to 20 microns whereby the agglomerates are subjected to a shearing action and are partially broken up to an extent that the volume of the material being subjected to deagglomeration is increased in volume by at least 100% and the smaller particles of silicon dioxide coat the finely divided nitrofurazone in contact therewith.

11. A method of preparing therapeutic dusts for the treatment of infections of the respiratory tract of poultry which comprises subjecting the mixture of 40 to 80% by weight of furazolidone micronized to a particle size within the range of 1 to 20 microns and 20 to 60% by weight of a silicon dioxide which is in the form of agglomerates of 1 to 20 microns, the said agglomerates being made up of discrete particles of silicon dioxide having a diameter of 5 to 20 millimicrons, to a deagglomeration process in which the agglomerates are subjected to a shearing action and are thereby broken up to an extent that the volume of the mixture being subjected to the deagglomeration process is increased in volume by at least 100% and the particles of the micronized furazolidone are covered with the smaller particles of the de-agglomerated silicon dioxide.

References Cited by the Examiner
UNITED STATES PATENTS

| | | | |
|---|---|---|---|
| 2,861,024 | 11/1958 | Silver | 167—53.1 |
| 3,088,874 | 5/1963 | Geary | 167—82 |

JULIAN S. LEVITT, *Primary Examiner.*

S. ROSEN, *Assistant Examiner.*